June 8, 1954  R. C. BOWERS  2,680,359
OVERLOAD PREVENTION DEVICE
Filed March 29, 1951
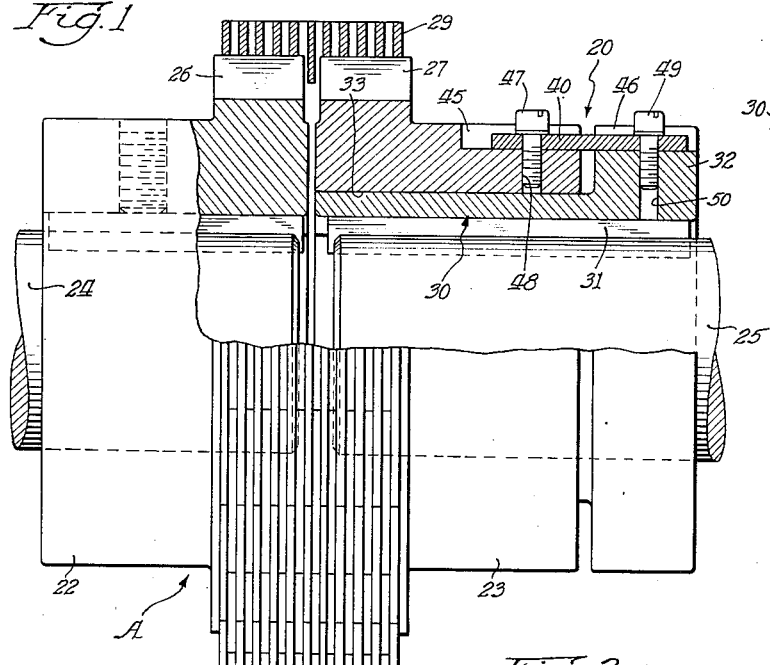
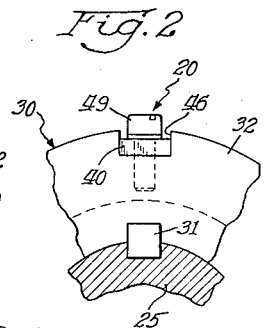
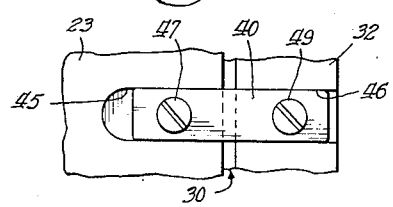
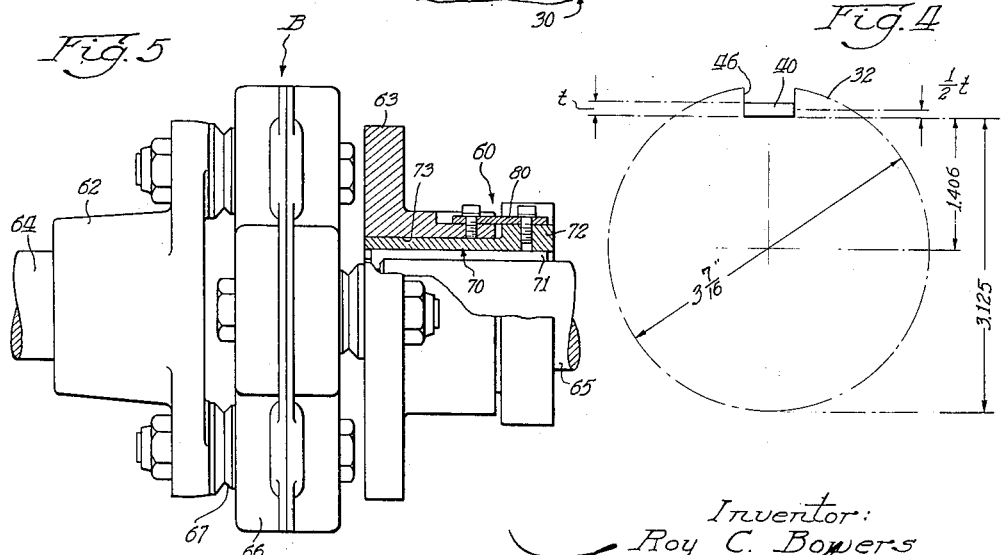
Inventor:
Roy C. Bowers

Patented June 8, 1954

2,680,359

UNITED STATES PATENT OFFICE 2,680,359

OVERLOAD PREVENTION DEVICE

Roy C. Bowers, Detroit, Mich., assignor to Morse Chain Company, Ithaca, N. Y., a corporation of New York Application March 29, 1951, Serial No. 218,242

1 Claim. (Cl. 64—28)

This invention relates in general to overload prevention devices and has particular reference to shear key devices advantageously adaptable to flexible couplings.

Otherwise stated, the invention is embodied in an overload prevention device having certain novel and useful characteristics particularly when incorporated with a flexible coupling of either the chain type or the rubber cushion type and whereby the flexible coupling and the attendant power transmission equipment may be protected from peak overloads calculated to cause destruction or damage to the power transmission equipment.

More specifically stated, it is a general object and accomplishment of the invention to provide a flexible coupling having incorporated therein an overload prevention device whereby the combined structure not only provides compensation for misalignment and a cushion for pulsating loads, but at the same time provides protection from peak overloads in excess of the capacity of the overload prevention device with which this invention is particularly concerned.

Another object and accomplishment of the invention is to provide an overload prevention device for a flexible coupling having the particular characteristic that when the overload prevention device is sheared due to an overload beyond the calculated capacity of the device there is nothing that can score the shafts nor can any fragments drop loose to endanger other surrounding machinery.

Another aspect of the invention is to provide an overload prevention device particularly adaptable to a flexible coupling or the like, said overload prevention device being characterized in that the capacity of the key may be calculated so as to provide accurate determination and regulation of the peak capacity of the device thereby affording safety and avoiding guess work in operation.

An ancillary object and accomplishment of the invention is to provide a new and improved overload prevention device which is adapted to be economically manufactured and which is so designed as to permit the manufacture and assembly thereof in accordance with present day large scale mass production manufacturing methods of construction and assembly.

The invention seeks, as a further object and accomplishment, to provide an overload prevention device as contemplated herein and characterized by an arrangement of parts to more advantageously and satisfactorily perform the functions required of it and adapted to provide a compact unit which will successfully combine the factors of structural simplicity and durability and yet be economical to manufacture.

Additional objects, features and advantages of the invention disclosed herein will be apparent to persons skilled in the art after the description and operation are understood from the within description.

Embodiments of the invention are illustrated in the accompanying drawings forming a part hereof and wherein like reference characters identify the same parts in the several views, and wherein:

Fig. 1 is a partial elevational view of a chain type flexible coupling having incorporated therein the overload prevention device embodying the features contemplated by this invention, parts of this view being shown in section to more clearly illustrate the construction thereof;

Fig. 2 is a fragmentary end elevational view of the overload prevention device depicted in Fig. 1;

Fig. 3 is a fragmentary plan view of the overload prevention device depicted in Fig. 1;

Fig. 4 diagrammatically illustrates a method of calculating the peak shear capacity of the key forming a part of the overload prevention device contemplated by this invention; and Fig. 5 is a side elevational view of a rubber cushion type flexible coupling having incorporated therein the overload prevention device contemplated by this invention, said device being of identical construction to that depicted in the chain type flexible coupling illustrated in Fig. 1.

The drawings are to be understood as being more or less of a schematic character for the purpose of illustrating and disclosing typical or preferred forms of the improvements contemplated herein.

Referring to the drawings, particularly Fig. 1, I have illustrated the shear key type overload prevention device with which the present invention is particularly concerned and designated in its entirety by the numeral 20, as being adjunctively employed, for example, to a chain type flexible coupling designated in its entirety by the letter A.

The flexible coupling A may comprise hubs 22 and 23 disposed in confronting relationship with respect to each other and being respectively mounted on axially aligned shafts 24 and 25, said hubs respectively being provided with teeth 26 and 27 disposed in encircling relationship with respect to the hubs and disposed adjacent each other in spaced parallel planes, and a chain 29 mounted on said teeth 26 and 27 in encircling relationship with respect to said hubs thereby to provide a drive arrangement through said coupling and yet permit limited angular misalignment of said shafts.

Suffice it to say, since the invention is not particularly concerned with the precise construction of the flexible coupling A and its component parts, they will not be further described in detail, and it is deemed sufficient for all intentions and purposes herein contained to show only portions thereof adjacent to and cooperating with the shear key type overload prevention device 20 contemplated herein. It is to be understood that details of construction of such flexible coupling A and its component parts may be modified to suit particular conditions, and I do not wish to be limited to the construction of these elements as set forth except where such construction particularly concerns the invention contemplated herein.

Having thus described, by way of example, a possible adaptation of the shear key type overload prevention device 20, and having described the general environment surrounding the adaptation, the specific construction and cooperating functions of the parts of said shear key type overload prevention device with which the present invention is particularly concerned will now be described in detail.

In the exemplary embodiment of the invention depicted in Figs. 1, 2 and 3, the shear key type overload prevention device 20 with which the present invention is particularly concerned comprises, in general, a hub 30 mounted on the shaft 25 for rotation therewith by means of a fitted key 31, said hub 30 at the outer end thereof being provided with a radially extending flange 32 and the remainder of the hub being adapted to receive the central bore 33 of the hub 23 so that the hub 23 is mounted on the hub 30 in a manner to permit relative rotation therebetween, and a shear key 40 connected between the hubs 23 and 30 thereby providing a driving connection between these hubs under normal load conditions within the calculated load capacity of the shear key.

Attention is directed to Figs. 1, 2 and 3 wherein it can be seen that the hubs 23 and 30 are respectively provided with recesses 45 and 46 adapted to accommodate the shear key 40, said shear key 40 being held within the confines of the recess 45 by the engagement of the sides thereof with the side walls of the recess 45 and by means of the bolt 47 adapted for threaded receipt into an aperture 48 disposed in the hub 23. In like manner portions of the shear key 40 are confined within the recess 46 of the hub 30 by the engagement of the sides of the shear key with the side walls of the recess 46 and by means of a bolt 49 adapted for threaded receipt into an aperture 50 disposed in the radially extending flange 32 of the hub 30.

It is obvious that either the shaft 24 or the shaft 25 may be the driving member while the other of said shafts will then become the driven member.

For purposes of illustrating one possible form of driving arrangement let it be assumed that the shaft 24 is the driving shaft and, therefore, the shaft 25 will become the driven shaft. Because the hub 22 is keyed to the shaft 24 for rotation therewith the drive will be from the drive shaft 24 through hub 22 and, because the teeth 26 are engaged with corresponding portions of the teeth of the chain 29, the drive will pass from the hub 22 to the chain 29 and, because the remaining portions of the teeth of the chain 29 are engaged with the teeth 27 of the hub 23 the drive will then pass from the chain to the hub 23. As was hereinbefore described, the hub 23 is mounted on the hub 30 for relative rotation therebetween but by virtue of the shear key 40 the hubs 23 and 30 are interlocked to provide rotation in unison of the hubs 23 and 30 under normal load conditions within the calculated capacity of the shear key 40. By virtue of the fitted key 31 the shaft 25 will rotate with the hub 30. Thus, it can be seen that the drive will be from the hub 23 through the shear key 40 to the hub 30 and, thereafter, to the shaft 25.

It is important to note that this arrangement provides a drive connection through said coupling and yet permits limited angular misalignment of the shafts and, more important, in combination with these aforementioned functions, the device provides an overload prevention feature facilitating safety in operation and whereby attendant power transmission equipment may be protected from peak overloads calculated to cause destruction or damage to such power transmission equipment.

It is of particular note that the instant shear type overload prevention device has the particular characteristic that when the device is sheared due to an overload beyond the calculated capacity of the device there is nothing that can score the shafts nor can any fragments drop loose to endanger other surrounding machinery. Moreover, the unique disposition of the shear pin radially outwardly and substantially removed from the central axis of the shafts provides the advantage in utilizing improved torque characteristics in the accurate calculation of the thickness of the shear key to accommodate certain predetermined load requirements.

A further important feature of the invention is that the novel arrangement and disposition of the shear key and its attendant parts provide the possibility of more accurate calculation in determining the load capacity of the shear key. In this connection, attention is invited to Fig. 4 wherein there is diagrammatically illustrated a method calculating the type and character of the shear key to accommodate a certain desired load. For purposes of illustration of one possible size let it be assumed that the diameter of the flanged end 32 of the hub 30 is $3\frac{7}{16}$ inches; therefore, the other dimensions in Fig. 4 will appear as indicated for purposes of calculation.

The following calculation then may be made to determine the thickness of the shear key 40:

1. Load at key centerline $$L = \frac{Q \times 12}{1.406 + 1/2t}$$

where $Q$ = Torque rating in ft. lbs.

2. Req'd shear area $$A = \frac{L}{34,000}$$

For mild carbon steel (1020 or equiv.) in rolled cond.

3. Req'd thickness $$t = \frac{A}{.375}$$

(Selected width of key)

Then $$.375t = \frac{\frac{12Q}{1.406 + 1/2t}}{34,000}$$

or $$6.375t^2 + 17.925t = .012Q$$

This expression can be reduced to the form:

$$t^2 + 2.812t - .00188Q = 0$$

and solved by the binomial theorem from the form:

$$t = \frac{-2.812 + \sqrt{7.91 + .00752Q}}{2}$$

By employing the aforementioned method of calculation it will be found that if the value of Q is 200 foot pounds then the value of $t$ will be .127, and if the value of Q is 250 foot pounds then the value of $t$ will be .158.

Attention is invited to Fig. 5 wherein there is illustrated a shear key type overload prevention device designated in its entirety by the numeral 60 of identical construction to that hereinbefore disclosed with respect to the shear key type overload prevention device 20 but being adjunctively employed, for example, to a rubber cushion type flexible coupling designated in its entirety by the letter B.

The flexible coupling B may comprise hubs 62 and 63 disposed in confronting relationship with respect to each other and being respectively mounted on axially aligned shafts 64 and 65, said hubs having disposed therebetween and operatively connected therewith a central member 66 provided with suitable rubber bushings as at 67 operable to permit a driving arrangement between said shafts and yet permit limited angular misalignment of said shafts.

As can be seen in Fig. 5 the shear key type overload prevention device 60 comprises, in general, a hub 70 mounted on the shaft 65 for rotation therewith by means of a fitted key 71, said hub 70 at the outer end thereof being provided with a radially extending flange 72 and the remainder of the hub being adapted to receive the central bore 73 of the hub 63 so that the hub 63 is mounted on the hub 70 in a manner to permit relative rotation therebetween, and a shear key 80 connected between the hubs 63 and 70 thereby providing a driving connection between these hubs under normal load conditions within the calculated load capacity of the shear key.

The shear key type overload prevention device 60 has the same general construction and operation characteristics as the shear key overload prevention device 20 hereinbefore described in connection with the chain type flexible coupling A illustrated in Fig. 1. Moreover, the same method of calculation of a required shear key may be employed as suggested with respect to the diagrammatical illustrations depicted in Fig. 4.

The instant shear key type overload prevention device being formed of relatively simple parts facilitating ease in assembly and maintenance itself to mass production manufacturing principles, thus affording a substantial saving in the manufacturing cost and a substantial saving in repair and maintenance.

From the foregoing disclosure, it may be observed that I have provided a shear key type overload prevention device which may be advantageously adjunctively employed with a flexible coupling and which efficiently fulfills the objects thereof as hereinbefore set forth and which provides numerous advantages which may be summarized as follows:

1. Structurally simple, efficient and durable;
2. Economical to manufacture and readily adaptable to mass production manufacturing principles; and
3. The provision of a flexible coupling having incorporated therein an overload prevention device whereby the combined structure not only provides compensation for misalignment and a cushion for pulsating loads, but at the same time provides protection from peak overloads in excess of the capacity of the overload prevention device with which this invention is particularly concerned.

While I have illustrated preferred embodiments of my invention, many modifications may be made without departing from the spirit of my invention, and I do not wish to be limited to the precise details of construction set forth but wish to avail myself of all changes within the scope of the appended claim.

I claim:

A flexible coupling adapted for interconnection between axially aligned shafts and operable to permit limited angular misalignment of said shafts and comprising a first hub provided with a first recess in its periphery, a second hub having at one end thereof a radially extending annular flange provided with a second recess in its periphery, said first hub being mounted on said second hub for relative rotation therebetween, and means defining a single flat bar shear pin of predetermined calculated thickness having one end thereof closely fitted into said first recess and the other end thereof closely fitted into said second recess, and removable fastening means passing through said shear pin and into said hub and said flange respectively, said single shear pin means interconnecting said hubs for driving relationship therebetween under normal load conditions within the calculated load capacity of the means, and said single shear pin means being arranged to shear responsive to a load condition beyond the calculated load capacity of the single shear pin means thereby to break said driving connection between said hubs and permit relative rotation therebetween while the respective parts of said single shear pin means are maintained in their secured positions respectively to said first and second hubs.

References Cited in the file of this patent

UNITED STATES PATENTS

| Number | Name | Date |
|---|---|---|
| 71,212 | Pierce | Nov. 19, 1867 |
| 1,574,466 | Brown | Feb. 23, 1926 |
| 2,388,186 | Rowsey | Oct. 30, 1945 |

FOREIGN PATENTS

| Number | Country | Date |
|---|---|---|
| 153,906 | Switzerland | 1932 |